(12) United States Patent
Masaki

(10) Patent No.: US 6,770,359 B2
(45) Date of Patent: Aug. 3, 2004

(54) MAGNETIC RECORDING MEDIUM

(75) Inventor: Kouichi Masaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 20 days.

(21) Appl. No.: 10/230,226

(22) Filed: Aug. 29, 2002

(65) Prior Publication Data

US 2003/0124386 A1 Jul. 3, 2003

(30) Foreign Application Priority Data

Sep. 3, 2001 (JP) .................................. P 2001-266018

(51) Int. Cl.$^7$ ............................................. G11B 5/706
(52) U.S. Cl. ................. 428/329; 428/336; 428/694 BH
(58) Field of Search ................................ 428/329, 336, 428/694 BH

(56) References Cited

U.S. PATENT DOCUMENTS 6,017,605 A * 1/2000 Yamazaki et al. .......... 428/65.3
6,096,406 A * 8/2000 Yamazaki et al. .......... 428/141

* cited by examiner

Primary Examiner—Stevan A. Resan
(74) Attorney, Agent, or Firm—Sughrue Mion, PLLC

(57) ABSTRACT

A magnetic recording medium comprising a support having provided thereon a nonmagnetic layer containing a nonmagnetic powder dispersed in a binder and a magnetic layer containing a ferromagnetic powder dispersed in a binder provided on the nonmagnetic layer, wherein the magnetic layer comprises a hexagonal ferrite powder having an average tabular diameter of from 10 to 35 nm, a coercive force (Hc) of from 135 to 400 kA/m, SFD (Switching Field Distribution) (25° C.) of from 0.40 to 0.90, and Δ SFD [SFD (100° C.)–SFD (25° C.)] of from 0.15 to 0.20.

7 Claims, No Drawings

MAGNETIC RECORDING MEDIUM

FIELD OF THE INVENTION

The present invention relates to a magnetic recording medium such as a magnetic tape, in particular, to a coating type magnetic recording medium (i.e., a magnetic recording particulate medium) comprising a support having provided thereon a magnetic layer formed by coating a magnetic coating solution containing a ferromagnetic powder and a binder as main components, further, the present invention relates to a magnetic recording medium for high density recording having a magnetic layer containing a hexagonal ferrite powder which is particularly suited for use in a system using an MR head utilizing magneto-resistance effect.

BACKGROUND OF THE INVENTION

As magnetic recording media such as a video tape, an audio tape, a computer tape and a flexible disc, those comprising a support having provided thereon a magnetic layer by coating a ferromagnetic iron oxide, a Co-modified ferromagnetic iron oxide, a $CrO_2$, a ferromagnetic metal powder or a hexagonal ferrite powder dispersed in a binder have so far been used. Of these magnetic powders, a hexagonal ferrite powder is well known to have excellent high density recording characteristics (e.g., JP-A-60-157719 (the term "JP-A" as used herein means an "unexamined published Japanese patent application"), JP-A-62-109226 and JP-A-3-280215). JP-A-5-12650 discloses to restrict the layer thickness of a magnetic layer containing the ferrite powder to the range of from 0.1 to 0.6 μm and to provide a nonmagnetic layer thicker than the magnetic layer between a support and the magnetic layer, to thereby improve surface property, short wavelength output, erasure property and durability. JP-A-5-225547 discloses a magnetic recording medium comprising a support having thereon a nonmagnetic layer and a magnetic layer containing a magnetic powder having a thickness of 0.1 μm or less on the nonmagnetic layer, which is excellent in every point of high frequency characteristics, overwriting of signals and durability.

The fact that the electromagnetic characteristics of magnetic recording media are affected by the anisotropic magnetic field Hk of a hexagonal ferrite is described in JP-A-3-286420 and IEEE. Trans. Mag., Vol. 24 (6), p. 2850 (November, 1988). JP-A-3-286420 discloses a magnetic recording medium having two magnetic layers on a nonmagnetic layer, wherein the lower magnetic layer has an axis of easy magnetization in the longer direction, and the upper magnetic layer contains a magnetic powder having anisotropic magnetic field (Hk) of 239 kA/m or less, and the same patent discloses that the magnetic recording medium is capable of high output in a wide range of from long wavelength to short wavelength. JP-A-8-115518 discloses a magnetic recording medium for high density recording which has a coercive force (Hc) of from 103.5 to 398 kA/m, an Hc/Hk of from 0.30 to 1.0, and the squareness ratio (SQ) in the direction of in-plane of from 0.65 to 1.00. The same patent is characterized in that the Hc, Hc/Hk and SQ in the in-plane direction of the magnetic layer containing a hexagonal ferrite powder are specified, by which short wave length output necessary for high density recording is conspicuously improved. However, when a system using an MR head is used, high noise is unfavorably generated.

A high sensitivity reproducing head (an MR head) utilizing magneto-resistance effect has come to be used in a data recording system for computer in recent years, and the system noise is governed by the noise coming from a magnetic recording medium. JP-A-7-182646 suggests to use an MR head for the reproduction of a magnetic recording medium in which a Ba ferrite is used. Okabe et al., suggest in IEEE. Trans. Mag., Vol. 32 (5), pp. 3404 to 3406 (1996) that it is preferred to use a magnetic recording medium using a Ba ferrite in combination with an MR head, because saturation of an MR head can be avoided. For reducing medium noise, fining of ferromagnetic particles has been advanced, however, it is presumed that the stability in magnetization transition region may come into problem by the influence of thermal fluctuation with the progress of fining of ferromagnetic particles. The stability of magnetization is evaluated KuV/kT (Ku is a magnetic anisotropy constant, V is a particle volume, k is a Boltzmann's constant, and T is an absolute temperature). With respect to the particle volume and the thermal fluctuation of a metal tape, Toshiyuki Suzuki et al., Shingaku Giho, MR 97-55, pp. 33 to 40 (Nov. 21, 1997) can be referred to. Regarding a Ba ferrite medium and thermal fluctuation, Toshiyuki Suzuki et al., also report in Shingaku Giho, MR 2000-45 (Nov. 14, 2000).

Since saturation magnetization of a hexagonal ferrite is about ⅓ to ½ of that of ferromagnetic metal powder, it is difficult to make Ku great and thermal fluctuation becomes large. In a magnetic recording medium using a hexagonal ferrite, it is said that the interaction between particles is large and that fact influences the noise level of the medium. It is said that magnetization stability is excellent when interaction between particles is large, but when a particle is subjected to magnetic flux revolution due to any reason, it is possible that surrounding particles are also subjected to magnetic flux revolution together. Perhaps for that reason, there is a problem that it is difficult to ensure sufficient C/N ratio when a magnetic recording medium for high density recording formed by a fined hexagonal ferrite powder is reproduced with an MR head.

SUMMARY OF THE INVENTION

The present invention has been done in view of the problems in the prior art techniques, and an object of the present invention is to provide a magnetic recording medium comprising a fine hexagonal ferrite powder which shows good short wavelength output and C/N ratio and recorded magnetization is stable when reproduced with an MR head.

The above object of the present invention has been attained by a magnetic recording medium comprising a support having provided thereon a nonmagnetic layer containing a nonmagnetic powder dispersed in a binder and a magnetic layer containing a ferromagnetic powder dispersed in a binder provided on the nonmagnetic layer, wherein the magnetic layer comprises a hexagonal ferrite powder having an average tabular diameter of from 10 to 35 nm, a coercive force (Hc) of from 135 to 400 kA/m, SFD (Switching Field Distribution) (25° C.) of from 0.40 to 0.90, and delta SFD (i.e., Δ SFD) [SFD (100° C.)–SFD (25° C.)] of from –0.15 to 0.20.

It is also preferred that the magnetic recording medium according to the present invention has a magnetic layer thickness of from 0.01 to 0.5 μm, a value of a residual magnetic flux density×a magnetic layer thickness of from 0.5 to 100 mT.μm.

DETAILED DESCRIPTION OF THE INVENTION

The present invention specifies each value of the particle size, Hc, SFD (25° C.) and delta SFD (i.e., i.e., Δ SFD: the change of SFD by the change of temperature or the temperature dependency of SFD) of a hexagonal ferrite powder, by which the short wave length output necessary for high density recording and the stability of magnetization can be markedly improved.

The hexagonal ferrite powder for use in the magnetic layer in the present invention preferably has an average tabular diameter of from 10 to 35 nm, a coercive force (Hc) of from 135 to 400 kA/m, and the coercive force (Hc) of the magnetic layer containing the hexagonal ferrite powder is preferably from 135 to 440 kA/m. A great Hc heightens an anisotropy constant (Ku) and a great Hc is preferred for achieving the object of the present invention of increasing thermal stability of magnetization.

Setting of the Hc of a magnetic layer largely depends upon the performance of the head for use in recording. Heads which are produced out of materials having a high saturation magnetic flux density (Bs), e.g., Fe—Ta—N, are preferably used. The upper limit of the Hc depends upon the materials of heads, but when a thin magnetic layer is used, it is supposed to be possible to perform recording to the above-described range of 440 kA/m or so, while when Hc is less than 135 kA/m, high density recording cannot be achieved.

SFD is obtained by measuring magnetization curve when a sample (a magnetic powder or a magnetic recording medium) has come to a thermal equilibrium state at a predetermined temperature (at 25° C. and 100° C.) by the applied magnetic field of 800 kA/m with a vibrating sample magnetometer (VSM). SFD, i. e., switching field distribution, is a value obtained by dividing the half value width delta Hc (i.e., $\Delta$ Hc) of a differential curve (dB/dH) of the magnetic hysteresis curve by Hc. Accordingly, delta SFD (i.e., $\Delta$ SFD) can be obtained by subtracting SFD at 25° C. [SFD (25° C.)] from SFD at 100° C. [SFD (100° C.)].

Hexagonal ferrite powders whose SFD (25° C.) is controlled in the range of from 0.40 to 0.90, and preferably from 0.40 to 0.80, and delta SFD in the range of from −0.15 to 0.20, are used in the present invention. Accordingly, SFD (100° C.) is to be controlled from 0.25 to 1.10, and preferably from 0.25 to 1.00.

Various methods are used for controlling the coercive force, SFD and delta SFD of a hexagonal ferrite powder, e.g., a method of controlling the composition, particle size and particle thickness, a method of controlling the thickness of the spinel phase of a hexagonal ferrite powder, a method of controlling the amount of the substituting element of the spinel phase of a hexagonal ferrite powder, and a method of controlling the position of the substitution site of a spinel phase. In particular, as the means for controlling SFD, making the composition among particles of a hexagonal ferrite powder uniform and making the particle size distribution represented by a tabular diameter and a tabular ratio small are preferred. Further, the adjustment of the composition of Co, Zn and Nb as the substitution elements and the adjustment of the composition of Zn, Ni, Ti and Mn can be exemplified.

For preventing the reduction of reproduction output due to saturation of an MR head, it is preferred in the present invention that a value of a residual magnetic flux density (Br) x a magnetic layer thickness ($\delta$) is from 0.5 to 100 mT·$\mu$m. When it is more than 100 mT·$\mu$m, saturation of an MR head is liable to occur, which is not preferred. A residual magnetic flux density is preferably from 70 to 200 mT, more preferably from 70 to 180 mT. The thickness of a magnetic layer is preferably from 0.01 to 0.55 $\mu$m, more preferably from 0.02 to 0.3 $\mu$m.

The decreasing slope of magnetization ($\Delta$ S) for evaluating the stability of magnetization is preferably from 0 to 0.05, more preferably from 0 to 0.045. Delta S (i.e., $\Delta$ S) is obtained by applying the same magnetic field as the Hc of the tape in the inverse direction after saturation magnetization by DC and measuring the decrease of magnetization for 1,000 seconds, searching for the slope (S) of magnetization decrease to 1 nt (t represents time, second) in 10 to 1,000 seconds, and normalizing this slope (S) by the residual magnetization Mr.

Thermal fluctuation magnetic field (Hf) is preferably from 0 to 2.0 kA/m, more preferably from 0 to 1.8 kA/m. An Hf is preferably smaller because of the stability against thermal fluctuation. Irreversible susceptibility $\chi$irre (the numeric value of the magnetic field strength near Hc is used) is obtained from Remanence curve, and thermal fluctuation magnetic field (Hf) can be computed from Hf=S/Xirre. Activation volume Va is obtained from Va=kT/(Ms.Hf), wherein k is a Boltzmann's constant, T is an absolute temperature, and Ms is saturation magnetization per volume.

It is known that the SFD of a magnetic recording medium is influenced by the squareness ratio (SQ) of a magnetic layer, and SQ is preferably from 0.50 to 0.70, more preferably from 0.55 to 0.65.

Hexagonal ferrite powders which are used in a magnetic layer (an upper layer) are described below. The examples of the hexagonal ferrite powders contained in the upper layer according to the present invention include substitution products of each barium ferrite, strontium ferrite, lead ferrite and calcium ferrite. Specifically, barium ferrite and strontium ferrite of magnetoplumbite type, and barium ferrite and strontium ferrite of magnetoplumbite type partially containing spinel phase are exemplified. Hexagonal ferrite powders may contain the following atoms in addition to the prescribed atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Those containing the following elements can be generally used, e.g., Co—Ti, Co—Ti—Zr, Co—Nb, Co—Ti—Zn, Co—Zn—Nb, Ni—Ti—Zn, Nb—Zn, Ni—Ti, Zn—Ti and Zn—Ni. From the viewpoint of SFD, pure magnetoplumbite type ferrites are desirable rather than composite type ferrites abundant in spinel phase. For controlling coercive force, a method of controlling the composition, particle size and particle thickness of a hexagonal ferrite powder, a method of controlling the thickness of the spinel phase of a hexagonal ferrite powder, a method of controlling the amount of the substituting element of the spinel phase, and a method of controlling the position of the substitution site of a spinel phase can be used.

The hexagonal ferrite powders of the present invention are generally a hexagonal tabular powder.

The size of the hexagonal ferrite powders is measured as follows.

The sizes of various powders such as a hexagonal ferrite powder and a carbon black (hereinafter referred to as "particle size") can be obtained by a high resolution transmission electron microphotograph and an image analyzer. That is, (1) when the figure of a particle is acicular, spindle-like or pole-like (provided that the height is larger than the maximum length of the base), the particle size is represented by the length of the long axis constituting the particle, i.e., a long axis length, (2) when the figure of a particle is tabular or pole-like (provided that the thickness or the height is smaller than the longest diameter of the tabular surface or the base), the particle size is represented by the longest diameter of the tabular surface or the base, and (3) when the figure of a particle is spherical, polyhedral or amorphous and the long axis constituting the particle cannot be specified from the figure, the particle size is represented by the equivalent-circle diameter. The equivalent-circle diameter means a diameter obtained by a projecting method.

The average particle size of the powder is the arithmetic mean of the particles and obtained by measuring about 350 primary particles in the above manner. The primary particles means independent particles not agglomerated.

In the above measurement, the short axis length of the particle is measured, and the arithmetic mean (long axis length/short axis length) of each particle is taken as the average acicular ratio of the particle. The short axis length means the length of the short axis constituting the particle in the case (1), the thickness or the height in the case (2), and (long axis length/short axis length) is taken as 1 for convenience sake in the case (3), since there is no distinction between the long axis and the short axis.

When the figure of a particle is specific, e.g., in the case of the above definition (1) of particle size, the average particle size is called an average long axis length, the average particle size is called an average tabular diameter and the arithmetic mean of (the longest long axis/thickness or height) is called an average tabular ratio in the case of definition (2), and the average particle size is called an average particle size in the case of definition (3).

Hexagonal ferrite powders for use in the present invention have an average tabular diameter of generally from 10 to 35 nm, and preferably from 15 to 35 nm, an average tabular thickness of generally from 2 to 15 nm, and preferably from 4 to 10 nm, and an average tabular ratio of preferably from 1.5 to 4, and more preferably from 2 to 3.8. When the tabular diameter is less than 10 nm, the specific surface area becomes large, which is not preferred as dispersion is difficult. These hexagonal ferrite powders have a specific surface area ($S_{BET}$) as measured by the BET method of generally from 25 to 120 m$^2$/g, and preferably from 40 to 100 m$^2$/g. When $S_{BET}$ is less than 25 m$^2$/g, noise increases and when it is larger than 120 m$^2$/g, dispersion is difficult and good surface property is hardly obtained, which is not preferred. Hexagonal ferrite powders preferably have a water content of from 0.3 to 2.0%. The water content of magnetic powders is preferably optimized by selecting the kinds of binders. The pH of magnetic powders is preferably optimized by the combination with the binder to be used. The pH is from 4 to 12, and preferably from 5.5 to 10. Magnetic powders may be surface-treated with Al, Si, P, Zr, Mg or oxides or hydroxides of them, if necessary. $Al_2O_3$, $nH_2O$ and $SiO_2 \cdot nH_2O$ are preferably used as the compounds for surface treatment, and it is preferred to change the amount and the proportion of the surface-covering compounds according to the binder to be used. The amount of the surface-covering compound is from 0.1 to 10 mass % (i.e., by weight) based on the magnetic powder. It is preferred for magnetic powders to be subjected to surface treatment, since adsorption of a lubricant, e.g., fatty acid, becomes 100 mg/m$^2$ or less. Soluble inorganic ions of Na, Ca, Fe, Ni or Sr are sometimes contained in magnetic powders, but the amount of such inorganic ions is preferably smaller. The amount of from 0 to 100 ppm gives no deleterious influence. There is the possibility that inorganic anions (e.g., $SO_4^{2-}$, $NO_3^-$ and $Cl^-$) may also corrode MR elements, hence the total amount of inorganic anions is preferably smaller. However, when the total amount of inorganic anions is in the range of from 0 to 50 ppm, they have no harmful influence upon MR heads. Hexagonal ferrite powders have as of 35 A·m$^2$/kg or more, and preferably 40 A·m$^2$/kg or more, and a tap density of 0.5 g/ml or more, and preferably 0.8 g/ml or more. Hexagonal ferrite powders are produced by a glass crystallization method, a coprecipitation method and a hydrothermal reaction method and any methods can be used in the present invention, but a glass crystallization method is preferred, since fine particles having good particle size distribution can be obtained.

As the binder resins in the magnetic layer in the magnetic recording medium according to the present invention, conventionally well-known thermoplastic resins, thermosetting resins, reactive resins and mixtures of these resins can be used. As the thermoplastic resins, those having a glass transition temperature of −100 to 150° C., a number average molecular weight of from 1,000 to 200,000, and preferably from 10,000 to 100,000, and the degree of polymerization of from about 50 to about 1,000 are preferably used.

The examples of binder resins include polymers or copolymers containing the following compounds as the constituting units, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins.

The examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate.

It is preferred that at least one polar group selected from the following groups is introduced into the above binder resins by copolymerization or addition reaction for the purpose of further improving the dispersibility of ferromagnetic powders and the durability of a magnetic layer, e.g., COOM, $SO_3M$, $OSO_3M$, $P=O(OM)_2$, $O-P=O(OM)_2$ (wherein M represents a hydrogen atom or an alkali metal salt group), OH, $NR_2$, $N^+R_3$ (wherein R represents an alkyl group, an alkenyl group, an acyl group, or an allyl group), an epoxy group, SH and CN. The amount of these polar groups is from $10^{-1}$ to $10^{-8}$ mol/g, preferably from $10^{-2}$ to $10^{-6}$ mol/g.

The addition amount of the binder resin for use in the present invention is from 5 to 50 mass %, and preferably from 10 to 30 mass %, based on the ferromagnetic powder. When vinyl chloride resins are used as the binder resin, the amount is from 5 to 100 mass %, when polyurethane resins are used, the amount thereof is from 2 to 50 mass %, and polyisocyanate is used in an amount of from 2 to 100 mass %, and it is preferred to use these resins in combination.

The packing density of hexagonal ferrite powders of the magnetic layer can be computed from as of the hexagonal ferrite powders used and the maximum magnetic flux density (Bm), i.e., the packing density is Bm/4nos, and the value in the present invention is preferably from 1.1 to 3.2 g/cm$^3$, and more preferably from 1.2 to 3.0 g/cm$^3$.

When polyurethane is used in the present invention, the polyurethane has a glass transition temperature of from −50 to 100° C., breaking extension of from 100 to 2,000%, breaking stress of from 0.05 to 10 kg/mm$^2$ (0.49 to 98 MPa), and a yielding point of from 0.05 to 10 kg/mm$^2$ (0.49 to 98 MPa).

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity.

The magnetic layer of the magnetic recording medium in the present invention may generally contain materials having various functions including a lubricant, an abrasive, a dispersant, an antistatic agent, a plasticizer and an antifungal agent according to the purpose.

As the lubricants for use in the magnetic layer in the present invention, silicone oils, e.g., dialkylpolysiloxane (the alkyl group has from 1 to 5 carbon atoms), dialkoxypolysiloxane (the alkoxyl group has from 1 to 4 carbon atoms), monoalkylmonoalkoxypolysiloxane (the alkyl group has from 1 to 5 carbon atoms and the alkoxyl group has from 1 to 4 carbon atoms), phenylpolysiloxane, and fluoroalkylpolysiloxane (the alkyl group has from 1 to 5 carbon atoms); electrically conductive fine particles, e.g., graphite; inorganic particles, e.g., molybdenum disulfide and tungsten disulfide; plastic fine particles, e.g., polyethylene, polypropylene, a polyethylene-vinyl chloride copolymer, and polytetrafluoroethylene; an alpha-olefin polymer; saturated fatty acid solid at room temperature (having from 10 to 22 carbon atoms); unsaturated aliphatic hydrocarbon liquid at room temperature (a compound having an n-olefin double bond at a terminal having about 20 carbon atoms); fatty acid esters comprising a monobasic fatty acid having from 12 to 20 carbon atoms and a monovalent alcohol having from 3 to 12 carbon atoms, and fluorocarbons can be used.

Of the above compounds, saturated fatty acids and fatty acid esters are preferably used, and it is more preferred to use them in combination. The examples of raw material alcohols of fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol, and polyhydric alcohols such as ethylene glycol, diethylene glycol, neopentyl glycol, glycerin, and sorbitan derivatives. The examples of raw material fatty acids of fatty acid esters include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid, and mixture of these acids.

The specific examples of fatty acid esters include various ester compounds, e.g., butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, acylated products of dipropylene glycol monobutyl ether with stearic acid, diethylene glycol dipalmitate, acylated diols of hexamethylene diol with myristic acid, and glycerin oleate.

Further, for reducing hydrolysis of fatty acid esters which often occurs when a magnetic recording medium is used under a high humidity condition, branched chain/straight chain, anisotropic structures such as cis/trans and branching positions of raw material fatty acids and alcohols are selected.

These lubricants are generally used in an amount of from 0.2 to 20 mass parts (i.e., weight parts) per 100 mass parts of the binder.

Besides the above-described lubricants, silicone oil, graphite, molybdenum disulfide, boron nitride, graphite fluoride, fluorine alcohol, polyolefin, polyglycol, alkyl phosphate, and tungsten disulfide can further be used as lubricants.

As the abrasive for use in the present invention, well-known materials having a Mohs' hardness of 6 or more are used, e.g., alpha,gamma-alumina, fused alumina, corundum, artificial corundum, silicon carbide, chromium oxide ($Cr_2O_3$), diamond, artificial diamond, garnet, emery (main components: corundum and magnetite) and alpha-$Fe_2O_3$. The specific examples of abrasives for use in the present invention include AKP-10, AKP-15, AKP-20, AKP-30, AKP-50, AKP-1520, AKP-1500, HIT-50, HIT-60A, HIT-60G, HIT-70, HIT-80, HIT-82 and HIT-100 (manufactured by Sumitomo Chemical Co., Ltd.), G5, G7, S-1, chromium oxide K (manufactured by Nippon Chemical Industrial Co., Ltd.), UB40B (manufactured by Uemura Kogyo K. K.), WA8000 and WA10000 (manufactured by Fujimi Kenma K. K.), LS600F 0/-1/4 (manufactured by LANDS Co.), MD-200, MD-150, MD-100, MD-70, IRM 0-1/4F, IRM 0-1/4FF (manufactured by Tomei Daiya Co., Ltd.), 0-1/10, 0-1/4 (manufactured by General Electric Co., Ltd.), Mypolex 1/10QG, 1/8QG (manufactured by Du Pont E. I. de Nemours), and TF100, TF140 and TF180 (manufactured by Toda Kogyo Co., Ltd.). Abrasives having an average particle size of from 0.05 to 1 $\mu$m are effective, and preferably from 0.05 to 0.5 $\mu$m.

Abrasives may be used alone but it is also preferred to use two or more kinds in combination. In the case of diamond fine particles, the addition amount to magnetic powders can be reduced to 0.1% or so by the use in combination with other abrasives. The total amount of these abrasives is generally from 1 to 20 mass parts per 100 mass parts of the magnetic powder, and preferably from 1 to 15 mass parts. When the addition amount is less than 1 mass part, sufficient durability cannot be obtained, while when the amount is higher than 20 mass parts, the packing density is deteriorated. Abrasives may be dispersed in a binder in advance before being added to a magnetic coating solution.

The magnetic layer in the magnetic recording medium according to the present invention can contain electrically conductive particles as the antistatic agent besides the above nonmagnetic powders. As the antistatic agent, carbon blacks are particularly preferably used in view of capable of reducing the surface electrical resistance of the magnetic recording medium itself. Furnace blacks for rubbers, thermal blacks for rubbers, carbon blacks for coloring, electrically conductive carbon blacks and acetylene blacks can be used as carbon blacks in the present invention. Carbon blacks preferably have a specific surface area ($S_{BET}$) of from 5 to 500 $m^2$/g, a DBP oil absorption amount of from 10 to 1,500 ml/100 g, a particle size of from 5 to 300 nm, pH of from 2 to 10, a water content of from 0.1 to 10%, and a tap density of from 0.1 to 1 g/ml. The specific examples of carbon blacks for use in the present invention include BLACK-PEARLS 2000, 1300, 1000, 900, 800 and 700, and VULCAN XC-72 (manufactured by Cabot Co., Ltd.), #80, #60, #55, #50 and #35 (manufactured by Asahi Carbon Co., Ltd.), #3030B, #3040B, #3050B, #3230B, #3350B, #9180B, #2700, #2650, #2600, #2400B, #2300, #950B, #900, #1000, #95, #30, #40, #10B, MA230, MA220 and MA77 (manufactured by Mitsubishi Chemical Corp.), CONDUCTEX SC, RAVEN 150, 50, 40 and 15 (manufactured by Columbia Carbon Co., Ltd.), and Ketjen Black EC, Ketjen Black ECDJ-500 and Ketjen Black ECDJ-600 (manufactured by Lion Akzo Co., Ltd.). Carbon blacks for use in the present invention may be surface-treated with a dispersant, may be subjected to oxidation treatment, may be grafted with a resin, or a part of the surface of may be graphitized before use. Carbon blacks may be previously dispersed in a binder before addition to a magnetic coating solution. Carbon blacks are added to a magnetic layer in an amount of preferably from 0.1 to 3 mass % based on the magnetic powder. Further, it is preferred to be added to a nonmagnetic layer, which is described later, in an amount of from 3 to 20 mass % based on the total amount of the nonmagnetic powder.

Carbon blacks are generally not only used as an antistatic agent but also have functions of reducing a friction coefficient, providing a light-shielding property, and improving film strength, and each carbon black has its own function. Accordingly, these carbon blacks can be used properly by changing the kind, the amount and the combination based on diverse characteristics, e.g., a particle size, an oil absorption amount, electrical conductance and pH. With respect to carbon blacks which can be used in the present invention, *Carbon Black Binran* (*Handbook of Carbon Blacks*), compiled by Carbon Black Kyokai can be referred to.

The magnetic recording medium according to the present invention having a magnetic layer containing a hexagonal ferrite powder is not particularly restricted so long as it has a nonmagnetic layer between a support and a magnetic layer, and well-known layer structures can be used. A nonmagnetic layer (also called a lower layer) is preferably a layer containing a nonmagnetic powder dispersed in a binder resin. Various nonmagnetic powders can be used in the nonmagnetic layer. The examples of nonmagnetic powders are selected from the following compounds and they can be used alone or in combination, e.g., alpha-alumina having an alpha-conversion rate of 90% or more, beta-alumina, gamma-alumina, tabular AlOOH, silicon carbide, chromium oxide, cerium oxide, alpha-iron oxide, goethite, corundum, silicon nitride, titanium carbide, titanium oxide, silicon dioxide, boron nitride, zinc oxide, calcium carbonate, calcium sulfate and barium sulfate. Of these compounds, alpha-iron oxide, goethite, titanium oxide, zinc oxide and tabular AlOOH are preferred for the reason that they are fine particles and uniform in particle size. These nonmagnetic powders preferably have a particle size of from 0.01 to 1 $\mu$m. If necessary, a plurality of nonmagnetic powders each having a different particle size may be combined, or a single nonmagnetic powder may have broad particle size distribution so as to attain the same effect as such a combination. For increasing the interaction with the binder resins to be used to thereby improve dispersibility, these nonmagnetic powders may be surface-treated. As the surface-covering material of nonmagnetic powders, inorganic substances, e.g., silica, alumina and silica-alumina, and coupling agents may be used. The nonmagnetic powders for use in the present invention have a tap density of from 0.3 to 2 g/ml, a water content of from 0.1 to 5 mass %, a pH value of from 2 to 11, a specific surface area ($S_{BET}$) of from 5 to 100 m$^2$/g. The figure of the nonmagnetic powders may be any of acicular, spherical, die-like and tabular shapes.

The specific examples of nonmagnetic powders include Nanotite (manufactured by Showa Denko Co., Ltd.), HIT-100 and HIT-80 (manufactured by Sumitomo Chemical Co., Ltd.), alpha-iron oxide DPN-250BX, DPN-245, DPN-270BX, DPN-550RX, DBN-450BX, DBN-650RX and DAN-850RX (manufactured by Toda Kogyo Co., Ltd.), titanium oxide TTO-51B, TTO-55A, TTO-55B, TTO-55C, TTO-55S, TTO-55D and SN-100 (manufactured by Ishihara Sangyo Kaisha Ltd.), titanium oxide STT-4D, STT-30D, STT-30 and STT-65C (manufactured by Titan Kogyo Co., Ltd.), titanium oxide MT-100S, MT-100T, MT-150W, MT-500B, MT-600B, MT-100F and MT-500HD (manufactured by TAYCA Corp.), FINEX-25, BF-1, BF-10, BF-20 and ST-M (manufactured by Sakai Chemical Industry Co., Ltd.), iron oxide DEFIC-Y and DEFIC-R (manufactured by Dowa Mining Co., Ltd.), AS2BM and TiO$_2$ P25 (manufactured by Nippon Aerosil Co., Ltd.), and 100A, 500A and calcined products of these compounds (manufactured by Ube Industries, Ltd.).

As described above, it is effective to form a plurality of magnetic layers on a support in the light of the production of a magnetic recording medium capable of high density recording, and a simultaneous coating method capable of producing an ultra-thin magnetic layer is particularly excellent. The simultaneous coating method, i.e., a wet-on-wet coating method, specifically includes the following methods.

(1) A method of coating a lower layer in the first place by any of gravure coating, roll coating, blade coating, and extrusion coating apparatuses, which are ordinarily used in the coating of a magnetic coating solution, and then coating an upper layer while the lower layer is still wet by means of a support pressing type extrusion coating apparatus as disclosed in JP-B-1-46186 (the term "JP-B" as used herein means an "examined Japanese patent publication"), JP-A-60-238179 and JP-A-2-265672.

(2) A method of coating a lower layer and an upper layer almost simultaneously using a coating head equipped with two slits for feeding coating solution as disclosed in JP-A-63-88080, JP-A-2-17971 and JP-A-2-265672.

(3) A method of coating an upper layer and a lower layer almost simultaneously using an extrusion coating apparatus equipped with a backup roll as disclosed in JP-A-2-174965.

When a magnetic recording medium is formed by a wet-on-wet coating method, it is preferred to use a magnetic layer coating solution and a nonmagnetic layer coating solution having flowing properties close to each other as far as possible to obtain a magnetic layer free of interfacial turbulence between the coated magnetic layer and nonmagnetic layer and uniform in thickness less in fluctuation. Since the flowing property of a coating solution greatly depends upon the combination of the particles of a powder and the binder resin in the coating solution, it is necessary to pay regard to the selection of, in particular, a nonmagnetic powder to be used in a nonmagnetic layer. After a nonmagnetic lower layer has been coated on a nonmagnetic support, dried, wound, and subjected to calendering treatment, if necessary, a magnetic layer may be coated.

The thickness of a support for the magnetic recording medium according to the present invention is generally from 3 to 100 μm, when the magnetic recording medium is used as a tape-like medium, the thickness of a support is preferably from 3 to 20 μm, when used as a flexible disc, it is preferably from 25 to 80 μm, and the thickness of a nonmagnetic layer provided on a support is generally from 0.5 to 5.0 μm, and preferably from 0.5 to 3 μm. The thickness of a magnetic layer is preferably from 0.01 to 0.5 μm. Layers other than the above magnetic layer and the nonmagnetic layer can be formed, according to purposes. For example, a subbing layer (i.e., an under coating layer) may be provided between the support and the lower layer for improving adhesion, and the thickness of the subbing layer is generally from 0.01 to 1 μm, preferably from 0.05 to 0.3 μm. A backing layer may be provided on the side of the support opposite to the side having the magnetic layer. The thickness of the backing layer is generally from 0.1 to 1.0 μm, preferably from 0.2 to 0.8 μm. Well-known subbing layers and backing layers can be used in the present invention. In the case of a disc-like magnetic recording medium, the magnetic layer may be provided on either side or on both sides.

Supports for use in the present invention are not especially restricted and any supports generally used can be used. As the materials for forming supports, films of various kinds of synthetic resins, e.g., polyethylene terephthalate, polyethylene, polypropylene, polycarbonate, polyethylene naphthalate, polyamide, polyamideimide, polyimide, polysulfone and polyether sulfone; and metal foils, e.g., an aluminum foil and a stainless steel foil, are exemplified.

For attaining the objects of the present invention, it is preferred to use a support having a central line average surface roughness (Ra) (cutoff value: 0.25 mm) of generally 0.03 μm or less, preferably 0.02 μm or less, and more preferably 0.01 μm or less. It is preferred that the support not only has a small central line average surface roughness but also is free from coarse protrusions having a height of 1 μm or more. Surface roughness configuration is freely controlled by the size and the amount of the fillers added to the support according to necessity. The examples of such fillers include acryl-based organic resin fine powders, as well as oxides and carbonates of Ca, Al, Si and Ti.

The F-5 value of the support in the running direction of the web is preferably from 5 to 50 kg/mm$^2$ (from 49 to 490 MPa), and the F-5 value in the transverse direction of the web is preferably from 3 to 30 kg/mm$^2$ (from 29.4 to 294 MPa). The F-5 value in the machine direction of the web is in general higher than the F-5 value in the transverse direction of the web, however, when the strength in the transverse direction of the web is particularly required to be heightened, this rule does not apply to the case.

The thermal shrinkage factor of the support in the running direction and the transverse direction of the web at 100° C. for 30 minutes is preferably 3% or less, more preferably 1.5% or less, and the thermal shrinkage factor at 80° C. for 30 minutes is preferably 1% or less, more preferably 0.5% or less. The support has breaking strength in both directions of from 5 to 100 kg/mm$^2$ (from 49 to 980 MPa), and the modulus of elasticity of preferably from 100 to 2,000 kg/mm$^2$ (980 to 19,600 MPa).

The organic solvents which are used in the present invention are selected from the following solvents and they are used in an optional proportion. The examples of suitable organic solvents include ketones, e.g., acetone, methyl ethyl ketone, methyl isobutyl ketone, diisobutyl ketone, cyclohexanone, isophorone and tetrahydrofuran; alcohols, e.g., methanol, ethanol, propanol, butanol, isobutyl alcohol, isopropyl alcohol and methylcyclohexanol; esters, e.g., methyl acetate, butyl acetate, isobutyl acetate, isopropyl acetate, ethyl lactate and glycol acetate; glycol ethers, e.g., glycol dimethyl ether, glycol monoethyl ether and dioxane; aromatic hydrocarbons, e.g., benzene, toluene, xylene, cresol and chlorobenzene; chlorinated hydrocarbons, e. g., methylene chloride, ethylene chloride, carbon tetrachloride, chlorofrom, ethylenechlorohydrin and dichlorobenzene; N,N-dimethylformamide and hexane. These organic solvents need not be 100% pure and may contain impurities such as isomers, non-reacted materials, byproducts, decomposed products, oxides and water, in addition to the main components. However, the content of such impurities is preferably 30% or less, more preferably 10% or less. The kind and the amount of the organic solvents to be used in the magnetic layer and the nonmagnetic layer may be different, if necessary. For instance, a highly volatile solvent is used in the lower layer so as to improve the surface property, a solvent having a high surface tension (e.g., cyclohexanone or dioxane) is used in the lower layer so as to improve a coating stability, or a solvent having a high dissolution parameter is used in the magnetic layer to increase the packing density. However, the present invention is not limited to these examples.

The magnetic recording medium according to the present invention can be obtained by kneading and dispersing the above ferromagnetic powder, the binder resin and, if necessary, other additives, with an organic solvent, coating the obtained coating solution on a support, and performing orientation and drying, as required.

Production process of the magnetic coating solution and the nonmagnetic coating solution of the magnetic recording medium of the present invention comprises at least a kneading process, a dispersing process and, optionally, a blending process to be carried out before and/or after the kneading and dispersing processes according to necessity. Each process may consist of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more processes in parts. For example, polyurethane can be added in parts at a kneading process, a dispersing process, or a blending process for adjusting viscosity after dispersion.

Various kneaders are used for kneading and dispersing a magnetic coating solution, e.g., a two-roll mill, a three-roll mill, a ball mill, a pebble mill, a trommel, a sand grinder, a Szegvari, an attriter, a high speed impeller, a high speed stone mill, a high speed impact mill, a disper, a kneader, a high speed mixer, a homogenizer, and an ultrasonic disperser can be used.

Powerful kneading machines such as a continuous kneader and a pressure kneader are preferably used in a kneading step to achieve high Br of a magnetic recording medium. When a continuous kneader or a pressure kneader is used, a magnetic powder and all or a part of a binder (preferably 30% or more of the total binders) are kneading-treated in the range of from 15 to 500 mass parts (i.e., weight parts) per 100 mass parts of the magnetic powder. Details of these kneading treatments are disclosed in JP-A-1-106338 and JP-A-64-79274. In the present invention, by the simultaneous multilayer coating method as disclosed in JP-A-62-212933, the production can be performed effectively.

The residual amount of the solvent in the magnetic layer of the magnetic recording medium according to the present invention is preferably 100 mg/m$^2$ or less, and more preferably 10 mg/m$^2$ or less, and the residual amount of the solvent in the magnetic layer is preferably smaller than that in the nonmagnetic layer.

The void ratio of the magnetic layer is preferably 30% by capacity or less, more preferably 20% by capacity or less, with the lower layer and the uppermost layer. The void ratio in the nonmagnetic layer is preferably larger than that in the magnetic layer, but if the void ratio in the nonmagnetic layer is 5% by capacity or more, it may be smaller than that in the magnetic layer.

It can be easily presumed that physical properties can be varied according to purposes in the lower layer and the magnetic layer. For example, the modulus of elasticity of the magnetic layer is made high to improve running durability and at the same time the modulus of elasticity of the lower layer is made lower than that of the magnetic layer to improve the head touching of the magnetic recording medium.

The ferromagnetic powder in the magnetic layer thus-coated on the support is subjected to orientation according to necessity, and then the magnetic layer formed is dried. If necessary, the thus-obtained web is subjected to surface smoothing treatment, cut to a desired shape, thereby a magnetic recording medium according to the present invention is obtained.

The modulus of elasticity at 0.5% elongation of the magnetic layer in the web-coating direction and the transverse direction is preferably from 100 to 2,000 kg/mm$^2$ (980 to 19,600 MPa), the breaking strength is preferably from 1 to 30 kg/mm$^2$ (9.8 to 294 MPa), themodulus of elasticity of the magnetic recording medium in the web-coating direction and the transverse direction is preferably from 100 to 1,500 kg/ mm$^2$ (980 to 14,700 MPa), the residual elongation is preferably 0.5% or less, and the thermal shrinkage factor at every temperature of 100° C. or less is preferably 1% or less, more preferably 0.5% or less, and most preferably 0.1% or less.

The magnetic recording medium according to the present invention may be used as tapes for video use and computer backup use, as a floppy disc and a magnetic disc for data recording use, but is especially effectively used as a medium for digital recording use where the dropout of a signal is fatal. Further, by the multilayer constitution of the nonmagnetic layer and the magnetic layer and by making the thickness of the magnetic layer 0.3 µm or less, high density and high capacity magnetic recording medium excellent in electromagnetic characteristics and overwriting characteristics can be obtained.

The novel characteristics of the present invention are described below with reference to the examples.

EXAMPLE

The present invention will be described below with reference to specific examples, but the present invention should not be construed as being limited thereto.

Formation of Hexagonal Ferrite Powder 1

As the raw materials of hexagonal ferrite powders, various compounds were weighed as follows calculated in terms of oxide. Use amounts X, Y and Z of the following components and the obtained magnetic powders (Production Examples 1 to 6) are shown in Table 1 below.

| | |
|---|---|
| $B_2O_3$ | 4.7 mol |
| $BaCO_3$ | 10.0 mol |
| $Fe_2O_3$ | X mol |
| $CoCO_3$ | 0.05 × X mol |
| ZnO | Y mol |
| $Nb_2O_5$ | Z mol |

The above components except $B_2O_3$ were dissolved in a citric acid at 120° C., the raw materials were mixed homogeneously with maintaining the temperature at about 200° C., and hydrolyzed at 450° C. The hydrolyzed product was further calcined in the air at 600° C. to remove free carbons. $B_2O_3$ was added to the calcined product and thoroughly mixed by a powder mixer, the mixture was put in a Pt—Rh crucible equipped with a stirrer, melted at 1,300 to 1,350° C. for 2 hours, exhausted between stainless steel twin cooling roller rotating at high velocity, thereby an amorphous product was obtained. The amorphous product was pulverized in a ball mill. Subsequently, the amorphous product was flattened in a ceramic container in a thickness of 2 cm, the container was put in an electric furnace maintained at 600° C. and retained there for 15 hours, and then immediately conveyed to an electric furnace maintained at 800° C. and retained there for 5 hours. The product treated was then put into a metal hopper maintained at room temperature, cooled, thus a crystal powder was obtained. The crystal powder was pulverized in a planetary mill, the pulverized powder was immersed in 2 mol/liter of an acetic acid aqueous solution, allowed to stand at 60° C. for 5 hours and vitreous component was removed, the remaining product was filtered and fine crystal was recovered. The recovered fine crystal was washed with a great quantity of ion exchange water, dried at 100° C. after being dehydrated, and further subjected to compaction treatment by a muller, thereby a ferromagnetic powder was obtained. The result of analysis of the obtained ferromagnetic powder by an X-ray diffraction method showed magnetoplumbite structure. The ferromagnetic powder was observed with a transmission electron microscope and the average particle size and the variation coefficient (standard deviation/average value) were measured. The ferromagnetic powder was subjected to deaeration treatment in nitrogen at 250° C. for 30 minutes, and the specific surface area was measured by the BET method. The magnetic characteristics were measured with a vibrating sample magnetometer (VSM) by the applied magnetic field of 800 kA/m. The obtained Ba ferrite was dissolved in a hydrochloric acid, and the analysis of the composition was performed by inductively coupled plasma spectroscopy (ICP). The composition is represented by atomic % of each element to Fe. The results obtained are shown in Table 1 below. In Comparative Examples 1 to 3, vitrification was performed on the same condition as in Example, the crystallization was performed at 800° C. and retained for 10 hours and vitreous component was removed.

TABLE 1

| Magnetic Powder | X (mol) | Y (mol) | Z (mol) | Average Tabular Diameter (nm) | Variation Coefficient of Tabular Diameter (%) | Average Tabular Thickness (nm) | Specific Surface Area (m²/g) | Hc (kA/m) | σs (A·m²/kg) | SFD (25° C.) | ΔSFD | Ba/Fe (atomic %) | Co/Fe (atomic %) | Zn/Fe (atomic %) | Nb/Fe (atomic %) |
|---|---|---|---|---|---|---|---|---|---|---|---|---|---|---|---|
| Production Example 1 | 5.6 | 0.50 | 0.11 | 22.7 | 31 | 6.6 | 67.2 | 145.2 | 49.2 | 0.80 | 0.09 | 7.81 | 0.99 | 4.38 | 1.98 |
| Production Example 2 | 5.9 | 0.35 | 0.11 | 22.2 | 30 | 7.0 | 68.3 | 190.5 | 50.8 | 0.72 | 0.18 | 7.4 | 0.9 | 2.93 | 1.94 |
| Production Example 3 | 6.3 | 0.10 | 0.04 | 22.4 | 29 | 6.8 | 67.8 | 233.2 | 51.2 | 0.55 | 0.17 | 8.47 | 0.84 | 0.72 | 0.62 |
| Production Example 4 | 5.6 | 0.50 | 0.11 | 28.7 | 32 | 7.6 | 58.4 | 151.2 | 50.2 | 0.82 | 0.24 | 7.8 | 1 | 4.41 | 1.97 |
| Production Example 5 | 5.9 | 0.35 | 0.11 | 29.1 | 33 | 8.1 | 57.9 | 191.1 | 51.5 | 0.73 | 0.45 | 7.41 | 0.89 | 2.95 | 1.95 |
| Production Example 6 | 6.3 | 0.10 | 0.04 | 28.4 | 31 | 7.5 | 56.6 | 232.5 | 51.8 | 0.59 | 0.52 | 8.5 | 0.83 | 0.74 | 0.63 |

Formation of Hexagonal Ferrite Powder 2

As the raw materials of hexagonal ferrite powders, various compounds were weighed as follows calculated in terms of oxide. Use amounts X, Y and Z of the following components and the obtained magnetic powders (Production Examples 7 to 9) are shown in Table 2 below.

| | |
|---|---|
| $B_2O_3$ | 4.7 mol |
| $BaCO_3$ | 10.0 mol |
| $Fe_2O_3$ | 7.0 mol |
| $MnCO_3$ | 0.015 mol |
| ZnO | X mol |
| NiO | Y mol |
| $TiO_2$ | Z mol |

The above components exclusive of $B_2O_3$ were dissolved in a citric acid at 120° C., the raw materials were mixed homogeneously with maintaining the temperature at about 200° C., and hydrolyzed at 450° C. The hydrolyzed product was further calcined in the air at 600° C. to remove free carbons. $B_2O_3$ was added to the calcined product and thoroughly mixed by a powder mixer, the mixture was put in a Pt—Rh crucible equipped with a stirrer, melted at 1,300 to 1,350° C. for 2 hours, exhausted between stainless steel twin cooling roller rotating, thereby an amorphous product was obtained. The amorphous product was pulverized in a ball mill. Subsequently, the amorphous product was flattened in a ceramic container in a thickness of 2 cm, the container was put in an electric furnace maintained at 625° C. and retained there for 15 hours, and then immediately conveyed to an electric furnace maintained at 800° C. and retained there for 5 hours. The product treated was then put into a metal hopper maintained at room temperature, cooled, thus a crystal powder was obtained. The crystal powder was pulverized in a planetary mill, the pulverized powder was immersed in 2 mol/liter of an acetic acid aqueous solution, allowed to stand at 60° C. for 5 hours and vitreous component was removed, the remaining product was filtered and fine crystal was recovered. The recovered fine crystal was washed with a great quantity of ion exchange water, dried at 100° C. after being dehydrated, and further subjected to compaction treatment by a muller, thereby a ferromagnetic powder was obtained. The result of analysis of the obtained ferromagnetic powder by an X-ray diffraction method showed magnetoplumbite structure. The ferromagnetic powder was observed with a transmission electron microscope and the average particle size and the variation coefficient were measured. The ferromagnetic powder was subjected to deaeration treatment in nitrogen at 250° C. for 30 minutes, and the specific surface area was measured by the BET method. The magnetic characteristics were measured with a VSM by the applied magnetic field of 800 kA/m. The obtained Ba ferrite was dissolved in a hydrochloric acid, and the analysis of the composition was performed by ICP. The composition is represented by atomic % of each element to Fe. The results obtained are shown in Table 2 below.

TABLE 2

| Magnetic Powder | X (mol) | Y (mol) | Z (mol) | Average Tabular Diameter (nm) | Average Tabular Thickness (nm) | Variation Coefficient of Tabular Diameter (%) | Specific Surface Area (m$^2$/g) | Hc (kA/m) | σs (A·m$^2$/kg) | SFD (25° C.) |
|---|---|---|---|---|---|---|---|---|---|---|
| Production Example 7 | 0.80 | 0.50 | 0.40 | 24.8 | 7.4 | 27 | 60.5 | 175.2 | 51.2 | 0.45 |
| Production Example 8 | 0.90 | 0.50 | 0.45 | 25.6 | 7.5 | 26 | 59.3 | 159.5 | 52.3 | 0.88 |
| Production Example 9 | 1.00 | 0.50 | 0.50 | 25.3 | 7.4 | 25 | 60.1 | 148.8 | 53.6 | 0.88 |

| Magnetic Powder | ΔSFD | Fa/Fe (atomic %) | Zn/Fe (atomic %) | Ni/Fe (atomic %) | Ti/Fe (atomic %) | Mn/Fe (atomic %) |
|---|---|---|---|---|---|---|
| Production Example 7 | −0.05 | 6.2 | 5.7 | 3.5 | 2.8 | 0.9 |
| Production Example 8 | −0.10 | 6.1 | 6.4 | 3.4 | 3.1 | 0.91 |
| Production Example 9 | −0.13 | 6 | 7.1 | 3.5 | 3.5 | 0.9 |

Preparation of Coating Solution

In Example, "parts" indicates "weight parts".

| Prescription of magnetic solution 1 | |
|---|---|
| Barium ferrite (magnetic powder, shown in TABLE 3) | 100 parts |
| Binder resin | |
| Vinyl chloride polymer an —SO$_3$K group content: 1 × 10$^{-4}$ eq/g, polymerization degree: 300 | 12 parts |
| Polyester polyurethane resin neopentyl glycol/caprolactone polyol/MDI = 0.9/2.6/1, an —SO$_3$Na group content: 1 × 10$^{-4}$ eq/g | 4 parts |
| alpha-Alumina average particle diameter: 0.15 μm | 2 parts |
| Carbon black average particle diameter: 30 nm | 5 parts |
| Butyl stearate | 2 parts |
| Stearic acid | 2 parts |
| Methyl ethyl ketone | 125 parts |
| Cyclohexanone | 125 parts |
| Prescription of magnetic solution 2 | |
| Barium ferrite (magnetic powder, shown in TABLE 4) | 100 parts |
| Binder resin | |
| Vinyl chloride polymer an —SO$_3$K group content: 1 × 10$^{-4}$ eq/g, polymerization degree: 300 | 15 parts |
| Polyester polyurethane resin neopentyl glycol/caprolactone polyol/MDI = 0.9/2.6/1, an —SO$_3$Na group content: 1 × 10$^{-4}$ eq/g | 6 parts |
| alpha-Alumina average particle diameter: 0.15 μm | 2 parts |
| Carbon black average particle diameter: 30 nm | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone | 125 parts |
| Cyclohexanone | 125 parts |
| Prescription of nonmagnetic solution 1 | |
| Acicular hematite specific surface area (S$_{BET}$):55 m$^2$/g, average long axis length: 0.10 μm, acicular ratio: 7, pH: 8.8, surface-covering compound: 1 mass% as Al$_2$O$_3$ | 80 parts |
| Carbon black average particle diameter: 17 nm, DBP oil absorption amount: 80 ml/100 g, | 20 parts |
| Binder resin | |
| Vinyl chloride polymer an —SO$_3$K group content: 1 × 10$^{-4}$ eq/g, polymerization degree: 300 | 12 parts |
| Polyester polyurethane resin neopentyl glycol/caprolactone polyol/MDI = 0.9/2.6/1, an —SO$_3$Na group content: 1 × 10$^{-4}$ eq/g | 5 parts |
| Phenylphosphonic acid | 3 parts |
| Butyl stearate | 3 parts |
| Stearic acid | 3 parts |
| Mixed solvent of methyl ethyl ketone and cyclohexanone (1/1) | 280 parts |
| Prescription of nonmagnetic solution 2 | |
| Acicular hematite specific surface area (S$_{BET}$): 55 m$^2$/g, average long axis length: 0.10 μm, acicular ratio: 7, pH: 8.8, surface-covering compound: 1 mass % as Al$_2$O$_3$ | 80 parts |
| Carbon black average particle diameter: 17 nm, DBP oil absorption amount: 80 ml/100 g, specific surface area (S$_{BET}$): 240 m$^2$/g, pH: 7.5 | 20 parts |
| Binder resin | |
| Vinyl chloride polymer an —SO$_3$K group content: 1 × 10$^{-4}$ eq/g, polymerization degree: 300 | 5 parts |
| Polyester polyurethane resin neopentyl glycol/caprolactone polyol/MDI = 0.9/2.6/1, an —SO$_3$Na group content: 1 × 10$^{-4}$ eq/g | 5 parts |
| Phenylphosphonic acid | 3 parts |
| Butyl stearate | 10 parts |
| Butoxyethyl stearate | 5 parts |
| Isohexadecyl stearate | 2 parts |
| Stearic acid | 3 parts |
| Mixed solvent of methyl ethyl ketone and cyclohexanone (1/1) | 280 parts |

With respect to prescription of magnetic solutions 1 and 2 and prescription of nonmagnetic solutions 1 and 2, pigment, polyvinyl chloride, phenylphosphonic acid (the nonmagnetic coating solution only) and 50 mass % of the prescribed amount of each solvent were kneaded in a kneader, then polyurethane resin and the remaining components were added and dispersed in a sand grinder with $ZrO_2$ beads having a diameter of 1 mm. Isocyanate was added to each solution, in an amount of 15 parts to each nonmagnetic solution and 14 parts to each magnetic solution, further 30 parts of cyclohexanone was added to each solution, and these solutions were filtered through a filter having an average pore diameter of 1 $\mu$m, thereby nonmagnetic layer-forming coating solutions and magnetic layer-forming coating solutions were prepared.

Preparation of Tape 1 Examples 11 to 16, Comparative Examples 11 to 13

Lower nonmagnetic layer-forming coating solution 1 was coated on a polyethylene terephthalate support having a thickness of 7.0 $\mu$m in a dry thickness of 1.5 $\mu$m, immediately thereafter magnetic layer-forming coating solution 1 was simultaneously multilayer-coated by wet-on-wet coating on the nonmagnetic layer while the lower nonmagnetic layer was still wet by controlling so as to obtain a prescribed thickness of the magnetic layer. The coated layers were subjected to orientation in the machine direction while both layers were still wet by passing through an orientation apparatus. The layers were passed through a rare earth magnet (magnetic flux of the surface: 500 mT), then a solenoid magnet (magnetic flux density: 500 mT) dried in the solenoid in such a degree as the orientation did not go back, and then the magnetic layer was further dried, and rolled up. After drying, the coated layer was subjected to calendering treatment through a calender of 7 stages comprising metal rolls at 90° C. The obtained web was slit to an 8 mm wide to obtain a sample of an 8 mm video tape. Magnetic characteristics, Remanence curve and thermal fluctuation magnetic field (Hf) of each tape were measured by using a vibrating sample magnetometer. Surface roughness and electromagnetic characteristics were also measured.

Preparation of Flexible Disc Examples 21 and 22, Comparative Example 21

Lower nonmagnetic layer-forming coating solution 2 was coated on a polyethylene terephthalate support having a thickness of 68 $\mu$m in a dry thickness of 1.5 $\mu$m, immediately thereafter magnetic layer-forming coating solution 2 was simultaneously multilayer-coated by wet-on-wet coating on the nonmagnetic layer while the lower nonmagnetic layer was still wet by changing the coating amount to vary the magnetic layer thickness. The coated layers were subjected to orientation in the machine direction while both layers were still wet by passing through a rare earth magnet with the same pole and counter positions having central magnetic field intensity of 398 kA/m, and then subjected to orientation by passing through an alternating current magnetic field generator having two magnetic field intensities of frequency of 50 Hz and magnetic field intensity of 24 kA/m and frequency of 50 Hz and magnetic field intensity of 12 KA/m. Degree of 50 Hz 98% or more could be achieved by orientation treatment.

The other side of the support was also subjected to the same coating, orientation treatment and drying, and then to calendering treatment with calenders of 7 stages at 90° C. at linear pressure of 300 kg/cm (294 kN/m). The obtained web was punched to a disc of 3.7 inches, subjected to thermo-treatment (70° C., 24 hours) to accelerate hardening treatment of the magnetic layer, subjected to burnishing treatment with an abrasive tape, and then to post treatment of paring the surface protrusions. The disc was encased in a 3.7 inch cartridge having a liner inside (A zip-disc cartridge manufactured by Iomega Co., Ltd., U.S.A.), and equipped the cartridge with prescribed mechanism parts to obtain a 3.7 inch floppy disc. Magnetic characteristics, Remanence curve and thermal fluctuation magnetic field (Hf) of the disc was measured by using a vibrating sample magnetometer. Surface roughness and electromagnetic characteristics were also measured.

Evaluation of Tape

Magnetic characteristics, surface roughness and electromagnetic characteristics of each of the obtained tapes were measured by a vibrating sample magnetometer. Eelectromagnetic characteristics were measured as follows. An MIG head (head gap: 0.2 $\mu$m, track width: 17 $\mu$m, saturation magnetic flux density: 1.5 T, azimuth angle: 20°) and an MR head for reproduction (SAL bias, MR element was Fe—Ni, track width: 6 $\mu$m, gap length: 0.2 $\mu$m, azimuth angle: 20°) were mounted on an 8 mm deck for data recording. Optimal electric current for recording was determined by the MIG head from input-output characteristics of 1/2 Th ($\lambda$=0.5 $\mu$m) with the relative velocity of the tape and the head as 10.2 m/sec, and signal was recorded by this electric current and reproduction was performed by the MR head. C/N was from the peak of reproduction carrier to demagnetization noise, and resolution band width of spectrum analyzer was made 100 kHz. C/N was represented with the tape in Comparative Example 12 as standard.

Evaluation of Flexible Disc

Output and S/N ratio were measured using RAW1001 type disc evaluating apparatus (manufactured by GUZIK Co., U.S.A.), a spin stand LS-90 (manufactured by Kyodo Electron System Co., Ltd.), and a metal-in-gap head having a gap length of 0.3 $\mu$m. Reproduction output (TAA) by linear recording density of 90 KFCI at the position of radius of 24.6 mm and the noise level after DC erasure of the disc were measured, from which S/N ratio was obtained.

Evaluation of Tape and Flexible Disc

Surface roughness of the area of 250 $\mu$m square was measured using a light interference type three dimensional roughness meter TOPO-3D (a product of WYKO, Arizona, U.S.A.). Inclination compensation, spherical compensation and cylindrical compensation were applied according to JIS-B601 in time of computation of a measured value. Central plane average surface roughness (Ra) was taken as a surface roughness value.

Magnetic characteristics (Hc, SQ and SFD) were measured using a vibrating sample magnetometer (a product of Toei Kogyo Co., Ltd.) by an external magnetic field at 800 kA/m in parallel to the orientation direction. A magnetic recording medium sample to be measured was set on the vibrating sample magnetometer of Toei Kogyo Co., Ltd. so that the orientation direction of the sample coincided with the direction of the magnetic field. Remanence curve Ir (H) was measured by repeating the procedure of demagnetization by AC to make residual magnetization 0.0005 A.m$^2$/kg or less, applying the magnetic field of 7.96 kA/m, returning the magnetic field to zero, measuring the residual magnetization Mr, changing the applied magnetic field by 7.96 kA/m, and measuring the residual magnetization. Remanence curve Id (H) was measured by repeating the procedure of applying −798 kA/m, saturation by DC, returning the magnetic field to zero, measuring the residual magnetization (−Mrmax), applying the magnetic field of 7.96 kA/m in the inverse direction, returning the magnetic field to zero, measuring the residual magnetization Mr, changing the applied magnetic field by 7.96 kA/m, and measuring the residual magnetization.

The decreasing slope of magnetization (delta S) was obtained by applying the same magnetic field as the Hc of the tape in the inverse direction after saturation magnetization by DC and measuring the decrease of magnetization for 1,000 seconds, searching for the slope (S) of magnetization decrease to 1 nt (t represents time, second) in 10 to 1,000 seconds, and normalizing this slope (S) by the residual magnetization Mr. Irreversible susceptibility $\chi$irre (the numeric value of the magnetic field strength near Hc was used) was obtained from Remanence curve, and thermal fluctuation magnetic field (Hf) was computed from Hf=S/$\chi$irre.

Anisotropic magnetic field Hk was obtained by measuring the value of rotational hysteresis loss Wr from low magnetic field by using a magnetic torque meter TRT-2-15-AUT (manufactured by Toei Kogyo Co., Ltd.), and measurement was performed up to 800 kA/m. The magnetic field where Wr became 0 was searched and this was taken as Hk by plotting the inverse number 1/H of the applied magnetic field and approximating data of high magnetic field side of Wr curve to curve of the second order.

The sample having a thickness of about 0.1 $\mu$m was cut out with a diamond cutter in the machine direction of the magnetic medium, observed with a transmission electron microscope of 50,000 magnifications and photographed. The print size of the photograph was from A4 to A5 size, and comprehensive magnifications of photographs was 200,000 magnifications. The present inventors paid attentions to the difference of the shapes of the ferromagnetic powders and the nonmagnetic powders of the magnetic layer and the nonmagnetic layer and rimmed the interface and the surface of the magnetic layer with black by visual judgement. Thereafter, the length of the rimmed lines was measured by the image processing apparatus IBAS2 (manufactured by Zeiss). Measurement was performed from 85 to 300 times when the length of the sample photographs was 21 cm. The average value of the measured values was taken as the thickness of the magnetic layer $\delta$.

TABLE 3

| Sample | Number of Magnetic Powder Used | Prescription of Magnetic Solution | Hc (kA/m) | SQ | SFD | Magnetic Layer Thickness $\delta$ ($\mu$m) | Br·$\delta$ (mT·$\mu$m) | Hk (kA/m) | Hf (kA/m) | Decreasing Slope | Surface Roughness (nm) | Output (dB) | C/N (dB) |
|---|---|---|---|---|---|---|---|---|---|---|---|---|---|
| Example 11 | Production Example 1 | 1 | 151.5 | 0.621 | 0.455 | 0.12 | 12.9 | 432.4 | 1.18 | 0.036 | 2.8 | 1.5 | 4.0 |
| Example 12 | Production Example 2 | 1 | 206.6 | 0.633 | 0.421 | 0.11 | 12.8 | 542.3 | 1.15 | 0.035 | 2.7 | 1.8 | 4.2 |
| Example 13 | Production Example 3 | 1 | 246.8 | 0.641 | 0.275 | 0.12 | 13.4 | 661.2 | 1.03 | 0.032 | 2.7 | 2.1 | 4.5 |
| Example 14 | Production Example 7 | 1 | 194.6 | 0.675 | 0.243 | 0.12 | 13.3 | 533.6 | 1.08 | 0.028 | 2.5 | 1.8 | 4.8 |
| Example 15 | Production Example 8 | 1 | 175.8 | 0.665 | 0.336 | 0.12 | 12.3 | 483.7 | 1.13 | 0.031 | 2.6 | 1.4 | 4.2 |
| Example 16 | Production Example 9 | 1 | 164.3 | 0.641 | 0.403 | 0.12 | 12.7 | 451.6 | 1.16 | 0.033 | 2.4 | 2.0 | 4.1 |
| Comparative Example 11 | Production Example 4 | 1 | 163.4 | 0.651 | 0.522 | 0.12 | 14.6 | 435.6 | 2.56 | 0.061 | 3.1 | −1.2 | −2.3 |
| Comparative Example 12 | Production Example 5 | 1 | 202.2 | 0.675 | 0.487 | 0.11 | 17.5 | 531.5 | 2.82 | 0.062 | 3.3 | −0.6 | −1.1 |
| Comparative Example 13 | Production Example 6 | 1 | 243.7 | 0.652 | 0.455 | 0.12 | 14.1 | 658.7 | 2.88 | 0.065 | 3.1 | 0.0 | 0.0 |

TABLE 4

| Sample | Number of Magnetic Powder Used | Prescription of Magnetic Solution | Hc (kA/m) | SQ | SFD | Magnetic Layer Thickness $\delta$ ($\mu$m) | Br·$\delta$ (mT·$\mu$m) | Hk (kA/m) | Hf (kA/m) | Decreasing Slope | Surface Roughness (nm) | Output (dB) | C/N (dB) |
|---|---|---|---|---|---|---|---|---|---|---|---|---|---|
| Example 21 | Production Example 2 | 2 | 195.5 | 0.597 | 0.576 | 0.11 | 10.5 | 544.5 | 1.16 | 0.033 | 2.8 | 1.5 | 3.8 |
| Example 22 | Production Example 7 | 2 | 180.5 | 0.595 | 0.588 | 0.11 | 10.6 | 535.1 | 1.09 | 0.027 | 2.9 | 1.4 | 4.1 |
| Comparative Example 21 | Production Example 5 | 2 | 196.2 | 0.589 | 0.613 | 0.11 | 10.3 | 530.2 | 2.83 | 0.061 | 3.2 | 0.0 | 0.0 |

It is apparent from the results in Tables 3 and 4 that the magnetic tapes and magnetic discs according to the present invention are excellent C/N or S/N as compared with that in comparative example.

Effect of the Invention

The magnetic recording medium according to the present invention has high C/N and small decreasing slope of magnetization as compared with conventional magnetic recording media, therefore, it is preferably used for high density recording and hardly accompanied by decrease of signals even after storage of a long period of time.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided thereon a nonmagnetic layer containing a nonmagnetic powder dispersed in a binder and a magnetic layer containing a ferromagnetic powder dispersed in a binder provided on the nonmagnetic layer, wherein the magnetic layer comprises a hexagonal ferrite powder having an average tabular diameter of from 10 to 35 nm, a coercive force (Hc) of from 135 to 400 kA/m, SFD (Switching Field Distribution) (25° C.) of from 0.40 to 0.90, and $\Delta$ SFD [SFD (100° C.)−SFD (25° C.)] of from −0.15 to 0.20.

2. The magnetic recording medium as in claim 1, wherein the magnetic recording medium has a value of a residual magnetic flux density x a magnetic layer thickness of from 0.5 to 100 mT.$\mu$m.

3. The magnetic recording medium as in claim 1, wherein the magnetic layer has a squareness ratio of from 0.50 to 0.70.

4. The magnetic recording medium as in claim 2, wherein the magnetic layer thickness is from 0.01 to 0.5 $\mu$m.

5. The magnetic recording medium as in claim 2, wherein the residual magnetic flux density is from 70 to 200 mT.

6. The magnetic recording medium as in claim 1, wherein the magnetic recording medium has a thermal fluctuation magnetic field (Hf) of from 0 to 2.0 kA/m.

7. The magnetic recording medium as in claim 1, wherein the hexagonal ferrite powder is produced by the steps of:

forming a complex containing starting materials for elements constituting the hexagonal ferrite and a citric acid;

thermal decomposing the complex; and subjecting the decomposed complex to a glass crystallization method.

* * * * *